(12) United States Patent
Zhou

(10) Patent No.: US 10,015,204 B2
(45) Date of Patent: Jul. 3, 2018

(54) METHOD, TERMINAL, AND SERVER FOR RESTORING TRANSMISSION OF SESSION CONTENT

(71) Applicant: Huawei Technologies Co., Ltd., Shenzhen (CN)

(72) Inventor: Haojun Zhou, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 567 days.

(21) Appl. No.: 14/462,818

(22) Filed: Aug. 19, 2014

(65) Prior Publication Data

US 2014/0359004 A1 Dec. 4, 2014

Related U.S. Application Data

(63) Continuation of application No. PCT/CN2012/078003, filed on Jun. 30, 2012.

(51) Int. Cl.
*H04L 29/06* (2006.01)
*H04L 29/12* (2006.01)

(52) U.S. Cl.
CPC .......... *H04L 65/1066* (2013.01); *H04L 61/10* (2013.01); *H04L 61/2575* (2013.01); *H04L 61/2589* (2013.01); *H04L 65/1069* (2013.01); *H04L 65/1083* (2013.01); *H04L 61/2514* (2013.01)

(58) Field of Classification Search
CPC ..... H04L 65/1069; H04L 51/10; G06F 15/16; G06F 3/0484; G06F 21/6218
USPC .................. 709/203, 213, 219; 370/235, 329
See application file for complete search history.

(56) References Cited

U.S. PATENT DOCUMENTS

| 3,977,656 A | * | 8/1976 | Faivre ..................... A23G 9/12 366/282 |
| 6,701,368 B1 | | 3/2004 | Chennapragada et al. |
| 8,185,660 B2 | | 5/2012 | Perumal et al. |
| (Continued) | | | |

FOREIGN PATENT DOCUMENTS

CN 102187698 A 9/2011

OTHER PUBLICATIONS

Foreign Communication From a Counterpart Application, PCT Application No. PCT/CN2012/078003, English Translation of International Search Report dated Apr. 11, 2013, 2 pages.

(Continued)

*Primary Examiner* — Tesfay Yohannes
(74) *Attorney, Agent, or Firm* — Gregg L. Jansen

(57) ABSTRACT

A method, a terminal, and a server for restoring transmission of session content. The method includes, after a refresh message for a page is received, retaining a first ICE address used by a session in the page to be in an activated state, and restoring transmission of session content of the session by using the first ICE address in the activated state, so that a terminal directly establishes a connection according to the first ICE address in the activated state after receiving a refreshed page, and after receiving a refresh message for a page, the terminal does not need to perform ICE address negotiation to determine a suitable ICE address for receiving and sending the session content, which shortens waiting time for interacting the session content with a peer-end user, thereby improving user experience.

14 Claims, 7 Drawing Sheets

(56) References Cited

U.S. PATENT DOCUMENTS

| | | | | |
|---|---|---|---|---|
| 8,228,861 | B1* | 7/2012 | Nix | H04W 36/00 370/329 |
| 8,356,344 | B2* | 1/2013 | Lin | H04L 29/12424 726/11 |
| 8,589,955 | B2* | 11/2013 | Roundtree | G06F 8/61 717/100 |
| 8,601,347 | B1* | 12/2013 | Koseki | G06F 11/1048 714/758 |
| 9,122,650 | B1* | 9/2015 | Colton | G06F 17/20 |
| 2006/0129933 | A1* | 6/2006 | Land | G11B 27/034 715/723 |
| 2006/0190563 | A1 | 8/2006 | Vann | |
| 2007/0130293 | A1* | 6/2007 | Dong | G06F 17/3089 709/219 |
| 2010/0027418 | A1* | 2/2010 | Rodrig | H04L 41/147 370/235 |
| 2010/0217874 | A1 | 8/2010 | Anantharaman et al. | |
| 2011/0119709 | A1* | 5/2011 | Kim | H04N 13/004 725/39 |
| 2011/0145397 | A1* | 6/2011 | Burns | H04L 29/1249 709/224 |
| 2011/0264909 | A1 | 10/2011 | Ejzak | |
| 2013/0031453 | A1* | 1/2013 | Griffiths | G06F 17/2247 715/230 |
| 2013/0117439 | A1* | 5/2013 | Oliver | H04L 65/1069 709/224 |
| 2013/0232217 | A1* | 9/2013 | Kristiansson | H04L 69/08 709/213 |

OTHER PUBLICATIONS

Foreign Communication From a Counterpart Application, PCT Application No. PCT/CN2012/078003, Written Opinion dated Apr. 11, 2013, 3 pages.

Tao, S., "ICE Negotiation when page reload in rtcweb," draft-li-rtcweb-ice-page-reload-02, Oct. 22, 2012, 7 pages.

Rosenberg, J., "Interactive Connectivity Establishment (ICE): A Protocol for Network Address Translator (NAT) Traversal for Offer/Answer Protocols," RFC 5245, Apr. 2010, 117 pages.

Uberti, J., et al., "Javascript Session Establishment Protocol," draft-ietf-rtcweb-jsep-01, Jun. 4, 2012, 31 pages.

Rosenberg, J., et al., "An Offer/Answer Model with the Session Description Protocol (SDP)," RFC 3264, Jun. 2002, 23 pages.

Rosenberg, J., "Interactive Connectivity Establishment (ICE): A Protocol for Network Address Translator (NAT) Traversal for Offer/Answer Protocols," Apr. 2010, 117 pages.

Foreign Communication From a Counterpart Application, Chinese Application No. 2012800007423, Chinese Search Report dated Nov. 23, 2015, 2 pages.

Foreign Communication From a Counterpart Application, Chinese Application No. 2012800007423, Chinese Office Action dated Dec. 2, 2015, 6 pages.

Mahy, R., et al., "Traversal Using Relays around NAT (TURN) : Relay Extensions to Session Traversal Utilities for NAT (STUN)," RFC 5766, Apr. 2010, 67 pages.

Foreign Communication From a Counterpart Application, European Application No. 12879716.4, Extended European Search Report dated Feb. 2, 2015, 9 pages.

* cited by examiner

METHOD, TERMINAL, AND SERVER FOR RESTORING TRANSMISSION OF SESSION CONTENT

CROSS-REFERENCE TO RELATED APPLICATIONS

This application is a continuation of International Application No. PCT/CN2012/078003, filed on Jun. 30, 2012, which is hereby incorporated by reference in its entirety.

TECHNICAL FIELD

The present invention relates to the communications field, and in particular, to a method, a terminal, and a server for restoring transmission of session content.

BACKGROUND

Real-time communication between browsers (WebRTC) is a technology for performing real-time video and audio communication within browsers. The technology mainly uses the HyperText Markup Language (HTML) protocol and the JavaScript language and can implement communication between browsers without using a plug-in.

WebRTC is mainly used to implement point-to-point communication between browsers, so as to implement a real point-to-point connection between two browsers. In a process of establishing a session between browsers, media information of the browsers needs to be negotiated in the process of establishing the session, where the media information may include a media sending/receiving address, an encoding/decoding manner and a protocol used for media transmission, and the like, and is borne by using the Session Description Protocol (SDP). In the process of establishing the session, an OFFER/ANSWER mechanism of SDP is used to perform media information negotiation, such as audio and video negotiation, and negotiation on encoding/decoding manner used by the media. When a network has a network address translator (NAT) or a firewall device, further, the Interactive Connectivity Establishment (ICE,) needs to be used to negotiate an available ICE address to perform point-to-point transmission of session content, so as to establish a connection (PeerConnection) of a session generated by using the browsers, thereby enabling the browsers to communicate with each other.

In an existing process of establishing the session, when a calling browser needs to send a request for establishing a session, the calling browser further needs to collect an available ICE candidate address for traversing an NAT or a firewall so as to send and receive session content. A process of collecting an ICE candidate address mainly is sending, by a browser, a request to a Session Traversal Utilities for Network Address Translator (STUN) server or a Traversal Using Relay NAT (TURN) server that serves the browser. The STUN or TURN server returns to the browser, in a returned response, an external communication address (that is, an ICE address) or a relay address (that is, an ICE address) on the server after traversing the NAT or the firewall. After completing collection of the ICE candidate address, the browser may send the ICE candidate address to a called party (which may be an Internet Protocol (IP) Multimedia Subsystem (IMS) terminal, a browser, or a common terminal) in a request for establishing a session or in a separate message. If the called party also supports ICE negotiation, the called party further needs to, after receiving the ICE candidate address sent by the calling browser, collect an ICE candidate address of a called end and send a collected ICE candidate address to the calling browser. In other words, a calling party and the called party both need to perform ICE address negotiation, so as to find one most suitable ICE address pair for transmission of session content. A process of negotiating the ICE address pair thereof mainly is performing negotiation by each ICE candidate address of the called party with each ICE candidate address of the calling party (which specifically is sending an NAT request packet from each ICE candidate address of the called party to each ICE candidate address of the calling party, and waiting to receive a response returned by using the ICE candidate address of the calling party), and performing negotiation by each ICE candidate address of the calling party with each ICE candidate address of the called party (which specifically is sending a NAT request packet from each ICE candidate address of the calling party to each ICE candidate address of the called party, and waiting to receive a response returned by using the ICE candidate address of the called party). If multiple pairs of addresses can mutually send and receive a correct response, a determining mechanism (for example, according to a priority condition of an ICE candidate address, preference of an application, and the like) defined in the ICE protocol is used to select one optimal ICE address pair including a calling ICE address and a called ICE address as addresses of the calling browser and the called browser for performing transmission of session content.

In an existing session process by using the browsers, if the calling browser or the called browser is refreshed (that is, refreshing is caused by user clicking or the browser is temporarily restarted due to a network problem), in order to restore a connection of an original session, the browsers need to perform ICE re-negotiation. However, four handshake negotiations in this process is time-consuming, so that the transmission of the session content is obviously interrupted, which results in poor user experience.

SUMMARY

Embodiments of the present invention provide a method, a terminal, and a server for restoring transmission of session content, which solves the problem where when a calling browser or a called browser is refreshed and ICE negotiation needs to be performed again for restoring content transmission of an original session, which is time-consuming and causes the session to be obviously interrupted, resulting in poor user experience.

A first aspect of the present invention provides a method for restoring transmission of session content, including: receiving a refresh message for a page, retaining a first ICE address in an ICE address pair used by a session in the page to be in an activated state, and sending a refresh request to a server; receiving a refreshed page returned by the server, wherein the refreshed page includes an application program; and running the application program to restore transmission of session content of the session by using the first ICE address in the activated state.

In a first possible implementation manner of the first aspect, before receiving a refresh message for a page, the method further includes sending information about an ICE address pair used by the session and a session identifier to the server, where the information about the ICE address pair used by the session includes information about the first ICE address and information about a second address.

In an implementation manner of a first possible and optional manner of the first aspect, the application program includes the information about the ICE address pair and the session identifier, and the information about the ICE address pair used by the session includes the information about the first ICE address and the information about the second address; and restoring session content of the session by using the first ICE address in the activated state includes assigning an ICE address in the activated state and corresponding to the information about the first ICE address to the session, and sending data to the second address.

In a second possible implementation manner of the first aspect, before receiving a refresh message for a page, the method further includes storing information about an ICE address pair used by the session and a session identifier, where the information about the ICE address pair used by the session includes information about the first ICE address and information about a second address; and the restoring transmission of content of the session by using the first ICE address in the activated state includes assigning the first ICE address in the activated state and corresponding to the information about the first ICE address to the session, and sending data to the second address.

In all possible implementation manners of the first aspect, retaining the first ICE address in the ICE address pair used by the session in the page to be in the activated state includes starting a timer and retaining the first ICE address to be in the activated state within a time range set by the timer.

With reference to third possibility of all first possible implementation manners of the first aspect, before restoring transmission of session content by using the first ICE address in the activated state, the method further includes determining that the first ICE address is in the activated state.

With reference to fourth possibility of the third possibility, after restoring transmission of session content by using the first ICE address in the activated state, the method further includes stopping the started timer, or determining that duration for retaining the first ICE address to be in the activated state reaches duration set by the timer, and stopping the started timer.

A second aspect of the present invention provides a terminal, including: a transceiver configured to receive a refresh message for a page; a retaining unit configured to, after the transceiver receives the refresh message for the page, retain a first ICE address in an ICE address pair used by a session in the page to be in an activated state, wherein the transceiver is further configured to send a refresh request to a server after the refresh message for the page is received and receive a refreshed page returned by the server, and wherein the refreshed page includes an application program; and a running unit configured to run the application program that is received by the transceiver and returned by the server, so as to restore transmission of session content of the session by using the first ICE address that is retained in the activated state by the retaining unit.

In a first possible implementation manner of the second aspect, before receiving the refresh message for the page, the transceiver is further configured to send information about an ICE address pair used by the session and a session identifier to the server, wherein the information about the ICE address pair used by the session includes information about the first ICE address and information about a second address.

In an implementation manner of a first possible and optional manner of the second aspect, the application program includes the information about the ICE address pair and the session identifier, and the information about the ICE address pair used by the session includes the information about the first ICE address and the information about the second address; and restoring, by the running unit, transmission of the session content of the session by using the first ICE address that is retained in the activated state by the retaining unit includes assigning an ICE address in the activated state and corresponding to the information about the first ICE address to the session, and sending data to the second address.

In a second possible implementation manner of the second aspect, the terminal further includes a storing unit configured to store information about an ICE address pair used by the session and a session identifier, wherein the information about the ICE address pair used by the session includes information about the first ICE address and information about a second address; and restoring, by the running unit, transmission of the session content by using the first ICE address that is retained in the activated state by the retaining unit includes assigning an ICE address in the activated state and corresponding to the information about the first ICE address to the session, and sending data to the second address.

With reference to a third possibility of all first possible implementation manners of the second aspect, retaining, by the retaining unit, the first ICE address in the ICE address pair used by the session in the page to be in the activated state includes starting a timer and retaining the ICE address to be in the activated state within a time range set by the timer.

In a fourth possibility with reference to the third possibility, the retaining unit is further configured to, after the running unit restores the transmission of the session content by using the first ICE address in the activated state, stop the started timer, or the retaining unit is further configured to determine that duration for retaining the first ICE address to be in the activated state reaches duration set by the timer, and stop the started timer.

A third aspect of the present invention provides a method for restoring transmission of session content, including: receiving information about an ICE address pair used by a session and a session identifier that are sent by a terminal, and binding and storing the information about the ICE address pair used by the session and the session identifier, wherein the information about the ICE address pair used by the session includes information about the first ICE address and information about a second address; receiving a refresh request sent by the terminal; and returning a refreshed page to the terminal, wherein the refreshed page includes an application program, and wherein the application program includes the information about the ICE address and the session identifier, so that the terminal assigns, by running the application program, the first ICE address in the activated state and corresponding to the information about the first ICE address to the session, and sends data to the second address.

A fourth aspect of the present invention provides a server, including: a transceiver configured to receive information about an ICE address pair used by a session and a session identifier that are sent by a terminal, where the information about the ICE address pair used by the session includes information about the first ICE address and information about a second address; and a storing unit configured to bind and store the information about the ICE address pair used by the session and the session identifier that are received by the transceiver, wherein the transceiver is further configured to receive a refresh request sent by the terminal, and return a refreshed page to the terminal, wherein the refreshed page includes an application program, and wherein the application program includes the information about the ICE address and the session identifier, so that the terminal assigns the first ICE address in the activated state and corresponding to the information about the first ICE address to the session, and sends data to the second address.

According to the above solutions, when a page is refreshed, causing that session interaction with a peer-end user cannot continue, for example, a sound, a message, or the like of the peer cannot be received, a first ICE address used by a session in the page continues to be retained in an activated state, so that a terminal, after receiving a refreshed page, establishes a connection directly according to the first ICE address in the activated state, and the terminal, after a refresh message for a page, does not need to negotiate an ICE address pair to determine a suitable ICE address for receiving and sending session content, which reduces waiting time for performing session content interaction with the peer-end user, thereby improving user experience.

BRIEF DESCRIPTION OF DRAWINGS

To illustrate the technical solutions in the embodiments of the present invention more clearly, the accompanying drawings required for describing the embodiments are briefly described in the following. The accompanying drawings in the following description merely show some embodiments of the present invention, and persons of ordinary skill in the art may still derive other drawings from the accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
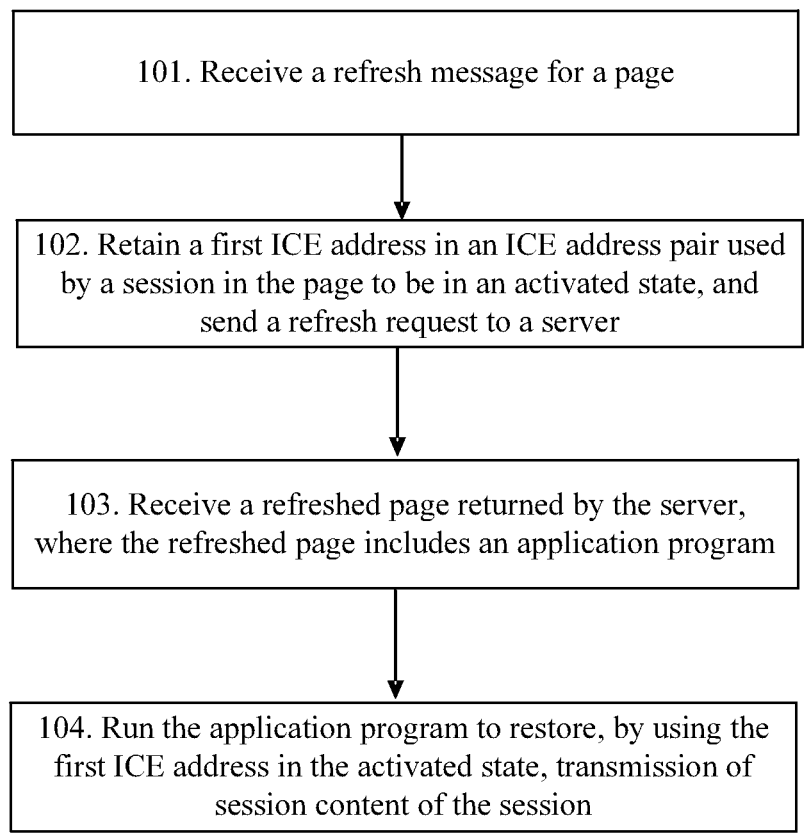
FIG. 1 is a flowchart of a method for restoring transmission of session content according to an embodiment of the present invention.

FIG. 1 is a flowchart of a method for restoring transmission of session content according to an embodiment of the present invention, which includes the following steps:

Step 101: Receive a refresh message for a page.

Specifically, a terminal receives the refresh message for the page when browsing a page by using a browser. The refresh message for the page may be sent by a user by using a refresh function of the page or be sent when the browser is restarted. This embodiment of the present invention sets no limit thereto.

Step 102: Retain a first ICE address in an ICE address pair used by a session in the page to be in an activated state, and send a refresh request to a server, where the ICE address pair used by the session includes an ICE address (which is referred to as a first ICE address in this embodiment of the present invention) used by the browser receiving the refresh message for the page and an address (which is referred to as a second address in this embodiment of the present invention) used by a peer-end user in the ICE address pair used by the session. The second address may be an ICE address or another address, where this embodiment of the present invention sets no limit thereto.

Specifically, the user needs to use the ICE address to connect to another user when establishing the session (for example, a WebRTC session) with the another user by using the browser of the terminal. In a session process, the terminal sends, by using the browser, a message to a STUN or TURN server assigning the first ICE address used by the session, and receives a response returned by the STUN or TURN server so as to retain the first ICE address to be in the activated state. However, in this embodiment of the present invention, even after receiving a refresh message, the terminal still continues to send a message to the STUN or TURN server assigning the first ICE address used by the session, so as to continue to retain the first ICE address used by the session to be in the activated state, and does not need to release a resource of the first ICE address corresponding to the session.

In addition, in a process of retaining the first ICE address in the ICE address pair used by the session in the page to be in the activated state, the terminal further sends a refresh request to the server, where the refresh request may include a uniform resource locator (URL) of the page, so that the server returns a refreshed page according to the URL.

Step 103: Receive a refreshed page returned by the server, where the refreshed page includes an application program.

Specifically, after a refresh message for a page sent by the terminal, the server acquires the refreshed page corresponding to the URL according to the URL included in the refresh message for a page, and returns the refreshed page to the terminal, where the refreshed page includes the application program, and the application program may be a JavaScript (JS) application program or another application program. This embodiment of the present invention sets no limit thereto.

Step 104: Run the application program to restore transmission of session content of the session by using the first ICE address in the activated state.

Specifically, after receiving the refreshed page, the terminal runs the application program (for example, the JS program) included in the page and runs the application program to restore, by using the ICE address in the activated state, receiving of content sent by a peer-end user of the session, and sending of content of the session to the peer-end user.

As can be seen from the above embodiment, when a page is refreshed, causing that transmission of session content with a peer-end user cannot continue, for example, a sound, a message, or the like of the peer cannot be received, a terminal continues to retain an ICE address used by a session in the page to be in an activated state, so that the terminal, after receiving a refreshed page, establishes a connection directly according to the ICE address in the activated state, and after receiving a refresh message for a page, the terminal does not need to negotiate an ICE address to determine a suitable ICE address for receiving and sending session content, which shortens waiting time for performing session content interaction with the peer-end user, thereby improving user experience.

Figure 2:
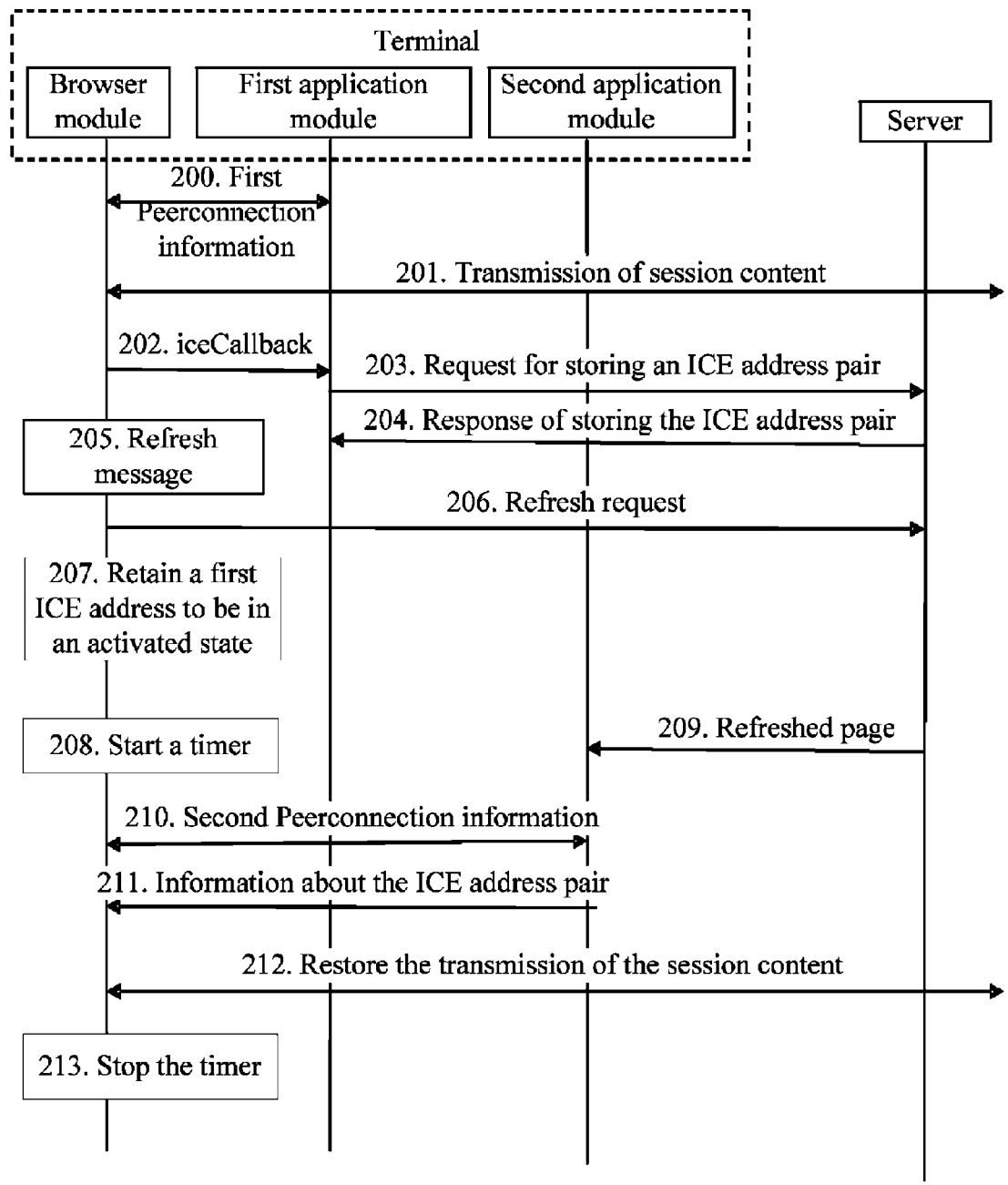
FIG. 2 is a flowchart of a method for restoring transmission of session content according to an embodiment of the present invention.

FIG. 2 is a flowchart of a method for restoring transmission of session content according to an embodiment of the present invention. In the implementation manner, a terminal stores, by using a first application module, an ICE address used by a session in a server, which includes the following steps:

Step 200: A user runs a first application program of a first application module by using a browser of a terminal to establish first PeerConnection information.

Specifically, the terminal includes a browser module, the first application module, and a second application module. The first application module stores the first application program, where the first application program is an application program used by the browser module to establish a session with a peer end, for example, a JS application program, or may be another application program. The second application module stores a second application program, where the second application program is an application program sent by a server after receiving a refresh request to the terminal.

When establishing a WebRTC session with a peer-end device, the terminal needs to run the first application program in the first application module to establish the first PeerConnection information corresponding to the WebRTC session. The first PeerConnection information records related information about the WebRTC session, for example, a WebRTC session identifier (for example, information about calling and called users, and other information that may identify a session), session description protocol (SDP) information used by the WebRTC session, state information (for example, whether it is in a connected state) of the WebRTC session, and state information indicating whether the WebRTC session has acquired the ICE address. In this embodiment, because the WebRTC session is established, the first PeerConnection information records state information indicating that the WebRTC session has acquired the ICE address.

If the same page has multiple WebRTC sessions that are being performed by a terminal user, each WebRTC session has one PeerConnection to record related information about the WebRTC session. In addition, the terminal further, after establishing the first PeerConnection information, sends the first PeerConnection information to the server, and synchronizes update of the first PeerConnection information to the server.

Step 201: The user implements, by using the WebRTC session established by the browser of the terminal with another terminal, transmission of session content with the another terminal (for example, a peer end).

Step 202: The browser module sends information about an ICE address pair used by the WebRTC session to the first application module.

Specifically, the terminal, by using the browser using an ICE address callback function (iceCallback( ) function) or another function, sends the ICE address used by the terminal in the WebRTC session to the application program of the first application module, that is, the first application program (for example, a JS program).

The iceCallback (cand, |moreToFollow|) function is used as an existing function for a browser to send a collected ICE candidate address to the application program of the first application module, where a value of a candidate address (cand) parameter is the ICE address. A more ICE address parameter (|moreToFollow|) has two optional values. When a value is true (true), it indicates that the browser will further send a candidate ICE address to the first application program; and when the value is false (false), it indicates that the browser will not send an ICE candidate address again to the same WebRTC session, that is, a procedure for collecting a ICE candidate address is completed.

In this embodiment, the ICE address callback function (iceCallback( ) function) may be used to carry the information about the ICE address pair used by the WebRTC session, which may be, for example, iceCallback (local-cand, remote-cand, |moreToFollow|, |Provided|). Certainly, it is also allowed that no |moreToFollow| parameter is carried, indicating that a cand address is the ICE address used by the WebRTC session, that is, iceCallback (local-cand, remote-cand, |moreToFollow|). In the ICE address callback function, a local parameter address (local-cand) represents that the WebRTC session eventually uses the ICE address (which is referred to as the first ICE address in this embodiment of the present invention), which is used by the browser that receives the refresh message for the page, in the ICE address pair. The parameter peer-end address (remote-cand) represents information of an address (which is referred to as the second address in the embodiment of the present invention), which is used by a peer-end user, in the ICE address pair used by the WebRTC session. Certainly, in another optional manner, the second address may be an ICE address or not an ICE address, where this embodiment of the present invention sets no limit thereto. Alternatively, one parameter, for example, |Provided| is further added to the iceCallback( ) function, that is, iceCallback (local-cand, remote-cand, |moreToFollow|, |Provided|). When |Provided| is false, it indicates that the local-cand and remote-cand address pair is not an ICE address used by the session; and when |Provided| is true (true), it indicates that information about the local-cand and remote-cand address pair is information about the ICE address pair used by the session. When |Provided| is true (true), |moreToFollow| needs to be set to false (false). Other settings are similar to those described above.

Certainly, in this embodiment of the present invention, a new function, for example, an ICE address discovery function (finalIce(local-cand, remote-cand) function) may also be used to send the information about the ICE address pair used by the WebRTC session to the first application program. In such a case, a cand value of the function is the information about the ICE address used by the WebRTC session.

In addition, the foregoing function may further be used to send only the ICE address used by the browser that receives the refresh message for the page, where this embodiment of the present invention sets no limit thereto.

Step 203: The first application module sends a request for storing the ICE address pair to the server, where the request for storing the ICE address pair includes the information about the ICE address pair used by the WebRTC session and the WebRTC session identifier. An hypertext transfer protocol (HTTP) POST request may be used as the request for storing the ICE address pair.

Step 204: The server sends a response of storing the ICE address pair to the first application module. Specifically, after receiving the request for storing the ICE address pair, the server binds and stores the ICE address pair and the WebRTC session identifier corresponding thereto, and sends a success response of storing the ICE address pair to the first application module.

Step 205: The terminal receives a refresh message for a page, and specifically, reference may be made to step 101, which is not described in detail in this embodiment of the present invention.

Step 206: The terminal sends a refresh request to the server. The refresh request may include a URL of the page, so that the server acquires the page corresponding to the URL and returns the page as a refreshed page to the browser module.

Step 207: The browser module retains the ICE address, namely, a first ICE address used by the session in the page to be in an activated state.

Specifically, the browser determines, according to first PeerConnection information corresponding to the WebRTC session, that the WebRTC session is in a connected state before the refresh message for the page is received, and continues to retain the first ICE address in the ICE address pair used by the WebRTC session to be in the activated state. However, after receiving the refresh message for the page, the browser deletes all content presented by the page and deletes related information about the first PeerConnection information corresponding to the WebRTC session.

In other words, the browser only retains the first ICE address in the ICE address pair used by the WebRTC session to be in the activated state, but a correspondence between the first ICE address and the WebRTC session is deleted.

It should be noted that steps 206 and 207 have no sequence in terms of time.

Step 208: The browser starts a timer for retaining the first ICE address to be in the activated state. That is, within a time range set by the timer, the first ICE address is retained to be in the activated state. Specifically, within the time range indicated by the timer, a request message is sent to a STUN or TURN server that assigns the first ICE address, and a response returned by the STUN or TURN server is received, so as to retain the activated state of the ICE address.

Step 209: The server responds to the refresh request by sending the refreshed page to the second application module of the terminal.

Specifically, the refreshed page including refreshed HTML code and a second application program (for example, a JS application program) is sent to the second application module of the terminal. In addition, the second application program further includes the information about the ICE address pair used by the WebRTC session and the first PeerConnection information corresponding to the WebRTC session. In addition, the second application program and the first application program may be the same program or be different application programs (for example, the information about the ICE address used by the WebRTC session and information about the WebRTC session identifier may be directly included in the second application program).

Step 210: Run the second application program delivered in step 209, and establish second PeerConnection information corresponding to the WebRTC session, so as to restore content transmission of the WebRTC session.

Specifically, the second application program includes the first PeerConnection information. The browser module establishes the second PeerConnection information corresponding to the WebRTC session by using the first PeerConnection information of the second application program delivered by the server in step 209. For example, a session identifier (for example, information about calling and called users) recorded in the first PeerConnection information and SDP information used by the WebRTC session before refreshing are recorded in the second PeerConnection information.

Step 211: Send the information about the ICE address pair used by the WebRTC session to the browser module, so that the browser module restores transmission of the session content of the WebRTC session corresponding to the session identifier by using the ICE address corresponding to the information about the ICE address pair.

Specifically, the second application module may send the information about the ICE address pair used by the WebRTC session to the browser module by using an ICE address response function. For example, a new application program interface (API) function, for example, the ICE address response function (icefeedback(|local-cand|, |remote-cand| function)), is used to carry the information about the ICE address, where ICE address response function is used by the second application module to send the information about the ICE address to the browser, local-cand represents information about the first ICE address in the ICE address pair that is eventually used by the session, and remote-cand represents information about the second address in the ICE address pair that is eventually used by the session.

In addition, the second application module may also use an existing API function, for example, a processing ICE address message function (processIceMessage(|candidate|) function), where the processIceMessage(|candidate|) function is an existing function for an application program (for example, a JS program) to send an ICE address of the peer end to the browser. The function may be expanded herein. For example, a parameter |final| is added, that is, processIceMessage (|local-cand|, |remote-cand|, |final|), where when a value of the |final| parameter is true, it indicates that a parameter local address local-cand represents the first ICE address in the ICE address pair used by the WebRTC session, and a parameter remote address remote-cand represents the second address in the ICE address pair that is eventually used by the session, so that the browser directly uses the address to make an ICE link; and when the value of the |final| parameter is false, an action of the function is the same as before.

Step 212: The browser module restores transmission of session content of the WebRTC session by using the ICE address pair.

Specifically, after receiving the ICE address pair sent by the JS, the browser module determines whether the first ICE address in the ICE address pair exists in the browser and is in the activated state; and when determining that the first ICE address is in the activated state, assigns the first ICE address to the WebRTC session and sends data to the second address, thereby restoring the transmission of the session content.

Step 213: The browser module stops the timer that is started before.

As an alternative manner, step 213 may be performed before step 212. That is, when the browser module determines, according to time set by the timer, that duration for retaining the first ICE address in the ICE address pair used by the WebRTC session to be in the activated state reaches duration set by the timer, the browser module stops the started timer, and does not retain the ICE address in the ICE address pair used by the WebRTC session to be in the activated state. In step 212, after receiving the ICE address pair sent by the JS, the browser module detects that the first ICE address in the ICE address pair does not exist in the browser or exists in the browser but is not in the activated state, the browser module cannot restore the transmission of the session content directly by using the ICE address pair corresponding to the information about the ICE address pair sent by the JS, but needs to perform ICE address pair negotiation again as in the prior art, so as to restore the transmission of the session content.

As can be seen from the above embodiment, when a page is refreshed, causing that session interaction with a peer-end user cannot discontinue, for example, a sound, a message, or the like of the peer cannot be received, a terminal continues to retain a first ICE address used by a session in the page to be in an activated state, so that the terminal, after receiving a refreshed page, establishes a connection directly by using the ICE address in the activated state, and after receiving a refresh message for a page, the terminal does not need to negotiate a first ICE address to determine a suitable ICE address for receiving and sending session content, which reduces waiting time for performing session content interaction with the peer-end user, thereby improving user experience.

Figure 3:
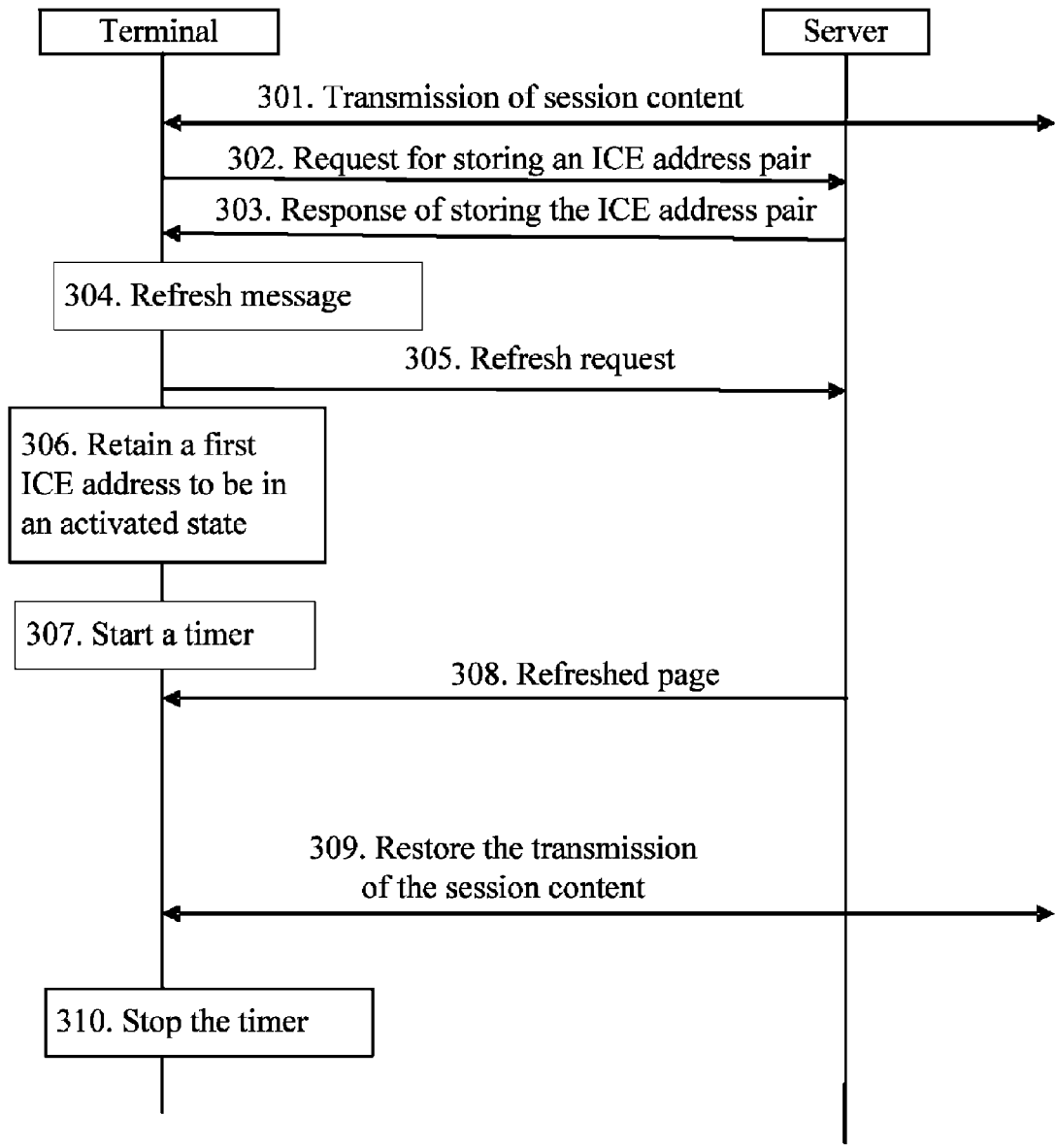
FIG. 3 is a flowchart of a method for restoring transmission of session content according to an embodiment of the present invention.

FIG. 3 is a flowchart of a method for restoring transmission of session content according to an embodiment of the present invention. The implementation manner is the same as a procedure corresponding to FIG. 2, where a terminal stores an ICE address used by a WebRTC session in a server, which includes the following steps:

Step 301: A user implements, by using a WebRTC session established by a browser of a terminal with another terminal, transmission of session content with the another terminal (for example, a peer end).

Before this step is performed, when establishing the WebRTC session with the peer-end user, the terminal establishes first PeerConnection information corresponding to the WebRTC session by running a first application program. The first PeerConnection information records related information about the WebRTC session, for example, a WebRTC session identifier (for example, information about calling and called users, and other information that may identify a session), SDP information used by the WebRTC session, and state information (for example, whether it is in a connected state) of the WebRTC session, information indicating whether the WebRTC session has negotiated the ICE address, and state information indicating whether the WebRTC session has acquired the ICE address. In this embodiment, because the WebRTC session is established, the first PeerConnection information records state information indicating that the WebRTC session has acquired the ICE address.

If the same page has multiple WebRTC sessions that are being performed by a terminal user, each WebRTC session has one PeerConnection information to record related information about the WebRTC session. In addition, the terminal further, after establishing the first PeerConnection information, sends the first PeerConnection information to the server and synchronizes update of the first PeerConnection information to the server.

Step 302: The terminal sends a request for storing the ICE address pair to the server, where the request for storing the ICE address includes information about the ICE address pair used by the WebRTC session and the first PeerConnection information corresponding to the WebRTC session. An HTTP POST request may be used as the request for storing the ICE address, so that the server binds and stores the ICE address and the WebRTC session identifier corresponding thereto.

Before performing this step, the terminal, by using the browser using an ICE address callback function (iceCallback( ) function) or another function, sends the ICE address, which is used by the terminal, in the WebRTC session, to a first application program (for example, a JS program). In this embodiment of the present invention, for the convenience of description, an application program used for establishing the WebRTC session before a refresh request is referred to as a first application program, and an application program that is run for restoring transmission of session content after a refresh message is received is referred to as a second application program. The first application program and the second application program may be the same or different, where this embodiment of the present invention sets no limit thereto.

The ICE callback function (iceCallback (cand, |moreToFollow|) function) is used as an existing function for a browser to send a collected ICE candidate address to the application program of the first application module, where a value of a candidate address (cand) parameter is the ICE address. A more ICE address parameter (|moreToFollow|) has two optional values. When a value is true (true), it indicates that the browser will further send a candidate ICE address to the first application program; and when the value is false (false), it indicates that the browser will not send an ICE candidate address again to the same WebRTC session; that is, a procedure for collecting an ICE candidate address is completed.

In this embodiment, the ICE address callback function (iceCallback( ) function) is used to carry the ICE address pair used by the WebRTC session, which may be, for example, iceCallback (local-cand, remote-cand, |moreToFollow|, |Provided|). Certainly, it is also allowed that no |moreToFollow| parameter is carried, indicating that the local-cand and remote-cand address is the ICE address pair used by the WebRTC session, that is, iceCallback (local-cand, remote-cand, |moreToFollow|). In the ICE address callback function, the parameter local address (local-cand) represents that the WebRTC session eventually uses the ICE address (which is referred to as the first ICE address in this embodiment of the present invention), which is used by the browser that receives the refresh message for the page, in the ICE address pair. The parameter peer-end address (remote-cand) represents an address (which is referred to as the second address in this embodiment of the present invention), which is used by the peer-end user, in the ICE address pair used by the WebRTC session. Certainly, in another optional manner, the second address may be an ICE address or not an ICE address, where this embodiment of the present invention sets no limit thereto. Alternatively, one parameter, for example, |Provided| is further added to the iceCallback( ) function, that is, iceCallback (local-cand, remote-cand, |moreToFollow|, |Provided|). When |Provided| is false, it indicates that a local-cand and remote-cand address pair is not an ICE address used by the session; and when |Provided| is true (true), it indicates that the local-cand and remote-cand address pair is the ICE address used by the session. When |Provided| is true (true), |moreToFollow| needs to be set to false (false). Other settings are similar to those described above.

Certainly, in this embodiment of the present invention, a new function, for example, an ICE address discovery function (finalIce(local-cand, remote-cand) function) may also be used to send the ICE address pair used by the WebRTC session to the first application program. In such a case, a cand value of the function is the ICE address used by the WebRTC session.

In addition, the foregoing function may also be used to send only the ICE address used by the browser that receives the refresh message for the page, where this embodiment of the present invention sets no limit thereto.

Step 303: The server sends a response of storing the ICE address pair to the terminal. Specifically, after receiving the request for storing the ICE address pair, the server binds and stores information about the ICE address pair and the WebRTC session identifier corresponding thereto, and sends a response of storing the ICE address pair to the terminal. Step 304 is the same as step 101, which is not described in detail in this embodiment of the present invention.

Step 305: The terminal sends a refresh request to the server. The refresh request may include a URL of the page, so that the server acquires the page corresponding to the URL and returns the page as a refreshed page to the terminal.

Step 306: The terminal retains the ICE address used by the session in the page to be in the activated state.

Specifically, if the terminal determines, according to the first PeerConnection information corresponding to the WebRTC session, that the WebRTC session before the refresh message for the page is received is in a connected state, the terminal continues to retain the first ICE address in the activated state. However, after receiving the refresh message for the page, the terminal deletes all content presented by the page and deletes the first PeerConnection information corresponding to the WebRTC session.

In other words, the terminal only retains the activated state of the first ICE address; however, a correspondence between the first ICE address and the WebRTC session is deleted.

It should be noted that steps 305 and 306 have no sequence in terms of time.

Step 307: The terminal starts a timer for retaining the first ICE address to be in the activated state. That is, within a time range set by the timer, the first ICE address is retained to be in the activated state. Specifically, within the time range indicated by the timer, a message is sent to the first ICE address, and a response returned from the first ICE address is received.

Step 308: The server responds to the refresh request by sending the refreshed page to the terminal.

Specifically, the refreshed page including refreshed HTML code and a second application program (for example, a JS application program) is sent to the terminal. In addition, the refreshed page further includes the information about the ICE address pair used by the WebRTC session and the first PeerConnection information corresponding to the WebRTC session. In addition, the second application program and the first application program may be the same program or be different application programs. For example, the information about the ICE address used by the WebRTC session and information about the WebRTC session identifier may be directly included in the second application program.

Step 309: The terminal restores the transmission of the session content of the WebRTC session by using the ICE address pair corresponding to the information about the ICE address pair.

Specifically, after receiving the refreshed page including the information about the ICE address pair and the first PeerConnection information corresponding to the WebRTC session, and the second application program that are sent by the server, the terminal detects whether the first ICE address exists in the browser and is in the activated state; and when determining that the first ICE address is in the activated state, assigns the first ICE address to the WebRTC session and sends data to the second address, thereby restoring the transmission of the session content.

Before performing this step, the terminal further needs to run the second application program delivered in step 309 and establish second PeerConnection information corresponding to the WebRTC session, so as to restore content transmission of the WebRTC session. For example, a session identifier (for example, information about calling and called users) recorded in the first PeerConnection information and SDP information used by the WebRTC session before refreshing are recorded in the second PeerConnection information.

In addition, the terminal may further acquire, by using an ICE address response function, the information about the ICE address pair used by the WebRTC session included in the refreshed page, so as to restore the transmission of the session content of the WebRTC session by using the ICE address pair corresponding to the information about the ICE address pair.

Specifically, the terminal may use a new application interface function (API function), for example, the ICE address response function (icefeedback(|local-cand|, |remote-cand| function)) to acquire the ICE address pair, where the function is used by a second application module to send the information about the ICE address to the browser, where a candidate address parameter, that is, a "|local-cand|, |remote-cand |" parameter, is the information about the ICE address pair to be sent; and may use an existing API function, for example, a processing ICE address message function (processIceMessage(|candidate|) function), where the processIceMessage(|candidate|) function is an existing function for an application program (for example, a JS program) to send an ICE address of the peer end to the browser. The function may be expanded herein. For example, a parameter |final| is added, that is, processIceMessage (|local-cand|, |remote-cand|, |final|). When a value of the |final| parameter is true, it indicates that ||local-cand| and |remote-cand||carry the information about the ICE address pair that is negotiated and determined before, so that the browser directly uses the address to make an ICE link. When the value of the |final| parameter is false, an action of the function is the same as before.

Step 310: The terminal stops the timer started before.

It should be noted that in a procedure corresponding to FIG. 3, the terminal may possibly receive the refresh message for the page for multiple times. If the refresh message for the page is received for the second time, the terminal stops performing an ongoing refresh step. If it is assumed that a refresh message for the page is received for the second time when the terminal is performing any one step of steps 305, 308, and 309, the terminal stops performing the ongoing step, such as any one step of steps 305, 308, and 309, and re-performs steps 305, 308, and 309; however, step 307 is not performed repeatedly. That is, the timer for retaining the ICE address to be in the activated state is not set again. When step 309 is performed in parallel, it is determined whether the ICE address is still in the activated state; if the ICE address is in the activated state, step 309 is performed; and otherwise, content transmission of the WebRTC session cannot be restored by directly using the information about the ICE address pair stored and sent by the terminal, but ICE address pair negotiation needs to be performed again as in the prior art, so as to restore the transmission of the session content.

As an alternative manner, step 310 may be performed before step 309. That is, when the terminal determines, according to duration set by the timer, that duration for retaining the ICE address in the ICE address pair used by the WebRTC session to be in the activated state reaches the duration set by the timer, the terminal stops the started timer and does not retain the ICE address used by the WebRTC session to be in the activated state (that is, stops sending a message packet to the ICE address and receiving a response returned from the ICE address). In step 309, after the terminal acquires the ICE address used by the WebRTC session and detects that it does not exist in the browser or exists in the browser but is not in the activated state, the terminal cannot restore the transmission of the session content by using the acquired and stored ICE address, but needs to perform ICE address negotiation again as in the prior art, so as to restore the transmission of the session content.

As can be seen from the above embodiment, when a page is refreshed, causing that a terminal cannot continue session interaction with a peer-end user, for example, a sound, a message, or the like of the peer cannot be received, an ICE address used by a session in the page is continued to be retained to be in an activated state, so that the terminal, after receiving a refreshed page, establishes a connection directly according to the ICE address in the activated state, and after receiving a refresh message for a page, the terminal does not need to negotiate an ICE address to determine a suitable ICE address for receiving and sending session content, which reduces waiting time for performing session content interaction with the peer-end user, thereby improving user experience.

Figure 4:
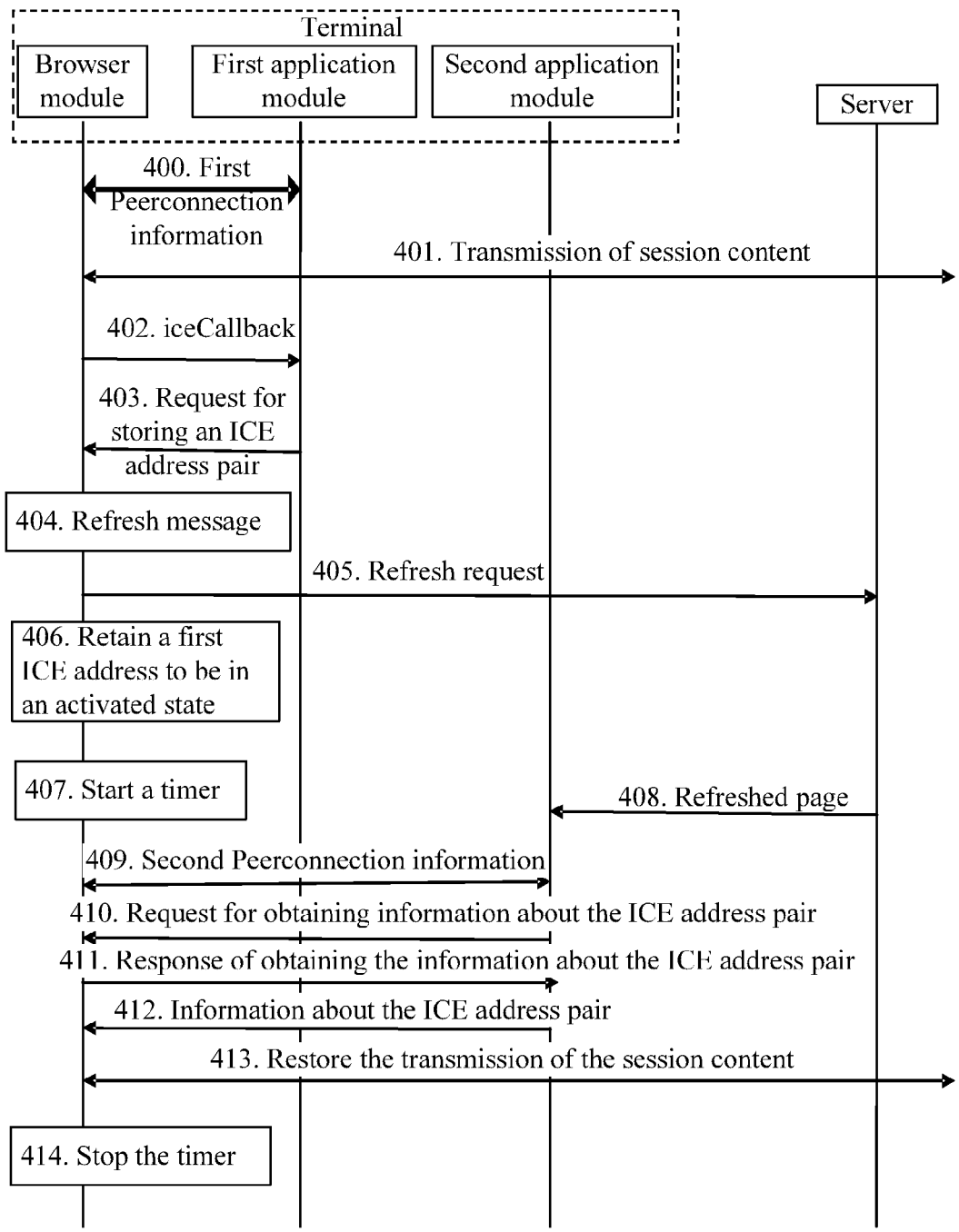
FIG. 4 is a flowchart of a method for restoring transmission of session content according to an embodiment of the present invention.

FIG. 4 is a flowchart of a method for restoring transmission of session content according to an embodiment of the present invention. In the implementation manner, a terminal stores, by using a first application module and using a web storage API function, an ICE address used by a WebRTC session in a browser module, which includes the following steps:

Steps 400 to 402 are the same as steps 201 to 202, which are not described in detail in this embodiment of the present invention.

Step 403: The first application module sends a request for storing an ICE address pair to a browser module, where the request for storing the ICE address pair includes information about the ICE address pair used by a WebRTC session and a WebRTC session identifier; and the browser module binds and stores the information about the ICE address pair and the session identifier of the WebRTC session corresponding thereto.

Specifically, after receiving the information about the ICE address pair, a first application program in the first application module invokes a session storage API function (session storage API, windows.sessionStorage.setItem("key", "value") function) in a browser local storage (Web storage), and binds and stores the session identifier of the WebRTC session and the information about the ICE address pair used by the WebRTC session. As an implementation manner, the function defines a variable having a name of key word, that is, "key", where a value thereof is "value". After the browser module receives the session storage API function, a variable having a variable name "key" and a value "value" is created and stored in the browser. In this embodiment, the first application program may use a variable name "PC-ICE", where "PC" is the session identifier of the WebRTC session, and a parameter "ICE" indicates that information about the ICE address pair is stored. Therefore, in such a case, the API may be a window session storage setting item windows.sessionStorage.setItem("PC-ICE", "candidate") function. The browser module, after receiving the function, stores the variable "PC-ICE" and the value thereof in the browser, where a value of "candidate" herein is the information about the ICE address pair received in step 402. After storage is completed, the first application program changes a state of an ICE address pair state parameter ("iceState" parameter) of a first PeerConnection to a state of ICE address state acquired, for example, "ICE_RECEIVED".

Step 404 is the same as step 205, which is not described in detail in this embodiment of the present invention.

Step 405 is the same as step 206, which is not described in detail in this embodiment of the present invention.

Steps 406 to 407 are the same as steps 207 to 208, which are not described in detail in this embodiment of the present invention.

It should be noted that steps 405 and 406 and step 407 have no sequence in terms of time.

Step 408: A server responds to a refresh request by sending a refreshed page to a second application module of a terminal.

Specifically, the refreshed page including refreshed HTML code and a second application program (for example, a JS application program) is sent to the browser module of the terminal, where the second application program includes first PeerConnection information.

Step 409: Run the second application program delivered in step 408 and establish second PeerConnection information corresponding to the WebRTC session, so as to restore content transmission of the WebRTC session.

Specifically, the browser module establishes the second PeerConnection information corresponding to the WebRTC session by using the first PeerConnection information included in the second application program. For example, a session identifier (for example, information about calling and called users) recorded in the first PeerConnection information, SDP information used by the WebRTC session before refreshing, and information about the ICE address negotiated by the WebRTC session are recorded in the second PeerConnection information.

Step 410: The second application module sends a request for acquiring the information about the ICE address pair to the browser module, where the request for acquiring the information about the ICE address pair carries the session identifier of the WebRTC session.

Specifically, the second application module invokes, by using the second application program, a browser local storage API function session storage API function, alert (windows.sessionStorage.getItem("PC-ICE"), so that the browser, after receiving the function, searches within the browser for a variable having a name "PC-ICE" and sends the stored information about the ICE address pair to the second application module.

Specifically, when the second application module determines, by using the second application program, that the state of the ICE address state parameter ("iceState" parameter) in the second PeerConnection is ICE address acquired "ICE_RECEIVED", it indicates that the first PeerConnection before refreshing records state information indicating that the WebRTC session has acquired the ICE address; and in such a case, the second application program may invoke the session storage API function (session storage API function) in web storage, so as to acquire the stored information about the ICE address used by the WebRTC session from the browser.

Step 411: The browser module sends a response of acquiring the information about the ICE address pair to the second application module, so as to return the information about the ICE address pair to the second application module.

Specifically, the browser module, after receiving the request for acquiring the information about the ICE address pair and after finding, according to the WebRTC session identifier, the "PC-ICE" variable that is stored before, returns the information about the ICE address pair in the PC-ICE variable to the second application module.

Step 412 is the same as step 211, which is not described in detail in this embodiment of the present invention.

Step 413 is the same as step 212, which is not described in detail in this embodiment of the present invention.

Step 414 is the same as step 213, which is not described in detail in this embodiment of the present invention.

It should be noted that in a procedure corresponding to FIG. 4, the browser module may possibly receive a refresh message for a page for multiple times. If the refresh message for the page is received for the second time, the browser module stops performing an ongoing refresh step. If it is assumed that a refresh message for a page is received for the second time when the browser module is performing step 408 or any step of steps 409, 410, 411, and 412, the browser module stops performing the ongoing step, such as step 408 or any step of steps 409, 410, 411, and 412, and re-performs steps 405 and 408 to 412; however, step 407 is not performed repeatedly. That is, a timer for retaining a first ICE address to be in an activated state is not set again. In step 413, after receiving the information about the ICE address pair sent by a JS, the browser module detects whether the first ICE address in the ICE address pair does not exist in the browser or exists in the browser but is not in the activated state, the browser module cannot restore the transmission of the session content directly by using the ICE address pair corresponding to the information about the ICE address pair sent by the JS, but needs to perform ICE address negotiation again as in the prior art, so as to restore the transmission of the session content.

As can be seen from the above embodiment, when a page is refreshed, causing that a terminal cannot continue session interaction with a peer-end user, for example, a sound, a message, or the like of the peer cannot be received, a first ICE address used by a session in the page is continued to be retained to be in an activated state, so that the terminal, after receiving a refreshed page, establishes a connection directly by using the first ICE address in the activated state, and after receiving a refresh message for a page, the terminal does not need to negotiate an ICE address to determine a suitable ICE address for receiving and sending session content, which reduces waiting time for performing session content interaction with the peer-end user, thereby improving user experience.

Figure 5:
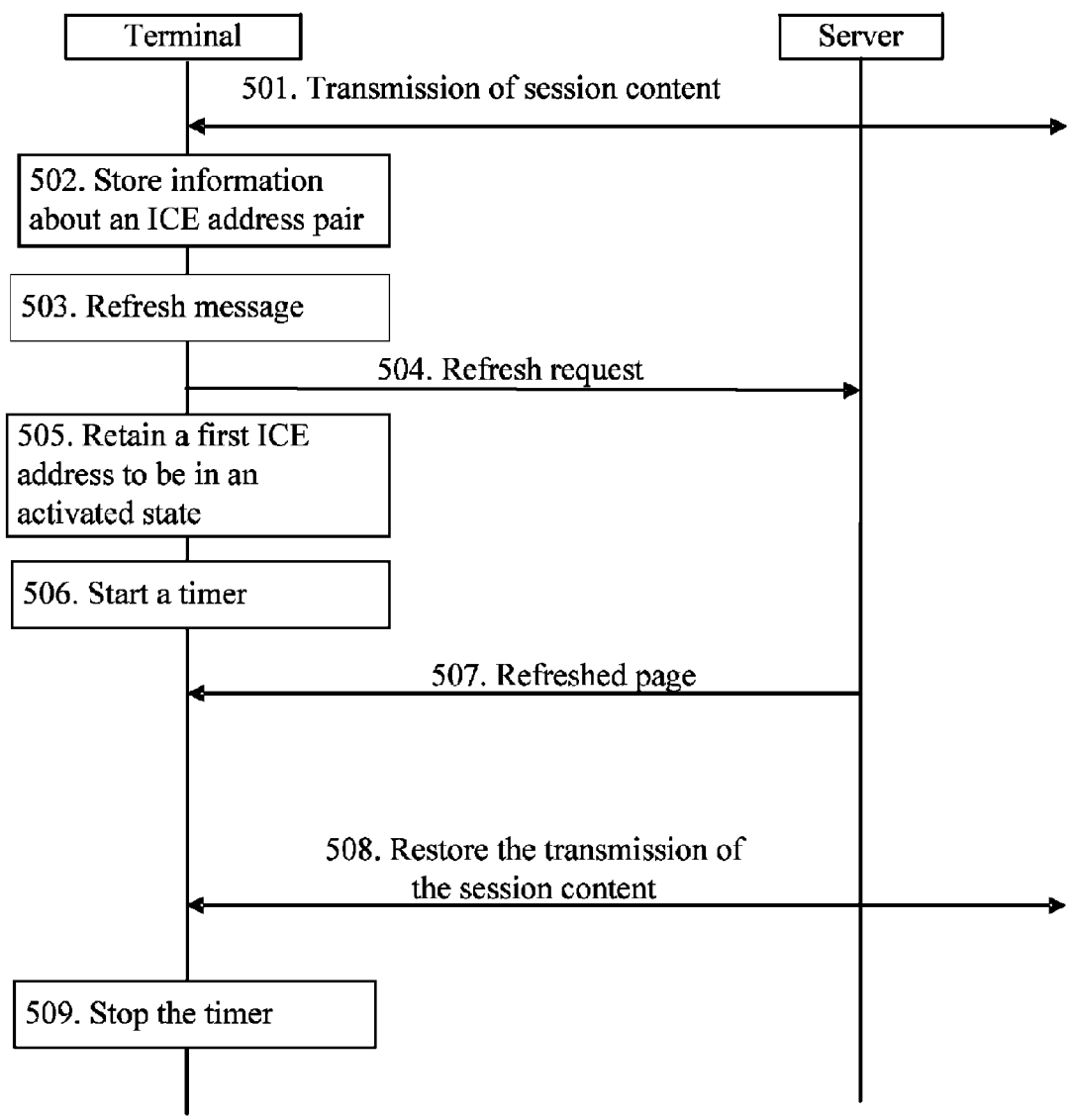
FIG. 5 is a flowchart of a method for restoring transmission of session content according to an embodiment of the present invention.

FIG. 5 is a flowchart of a method for restoring transmission of session content according to an embodiment of the present invention. In the implementation manner, a terminal stores, by using a web storage API function, an ICE address used by a WebRTC session, which includes the following steps:

Step 501 is the same as step 301, which is not described in detail in this embodiment of the present invention.

Step 502: The terminal stores information about an ICE address pair used by a WebRTC session.

Specifically, before performing this step, the terminal, by using a browser, sends information about the ICE address pair, which is used by the terminal, in the WebRTC session, to a first application program (for example, a JS program) by using an ICE address callback function (iceCallback( ) function) or another function.

After receiving the information about the ICE address pair, the first application program invokes a session storage API function (session storage API, windows.sessionStorage.setItem("key", "value") function) in web storage, and binds and stores a session identifier of the WebRTC session and the information about the ICE address pair used by the WebRTC session.

Step 503 is the same as step 304, which is not described in detail in this embodiment of the present invention.

Step 504 is the same as step 305, which is not described in detail in this embodiment of the present invention.

Steps 505 to 506 are the same as steps 306 to 307, which are not described in detail in this embodiment of the present invention.

It should be noted that steps 504 and 505 and step 506 have no sequence in terms of time.

Step 507: A server responds to a refresh request by sending a refreshed page to the terminal.

Specifically, the refreshed page including refreshed HTML code and a second application program (for example, a JS application program) is sent to the browser module of the terminal, where the second application program includes first PeerConnection information.

Step 508: The terminal restores transmission of session content of the WebRTC session by using the ICE address.

Specifically, the terminal runs the second application program and establishes second PeerConnection information corresponding to the WebRTC session by using first PeerConnection information included in the second application program. For example, a session identifier (for example, information about calling and called users) recorded in the first PeerConnection information, SDP information used by the WebRTC session before refreshing, and information about the ICE address negotiated by the WebRTC session are recorded in the second PeerConnection information.

The second application program invokes a browser local storage API function session storage API function, alert (windows.sessionStorage.getItem("PC-ICE") function, so that the browser, after receiving the function, searches within the terminal for a variable having a name "PC-ICE".

Specifically, when the second application program determines that a state of an ICE address state parameter ("iceFinalState" parameter) in the second PeerConnection is ICE address acquired "ICE_RECEIVED", it indicates that the first PeerConnection before refreshing records state information indicating that the WebRTC session has acquired the ICE address; and the second application program may invoke a session storage API function in web storage, so as to acquire the stored information, which is stored by the terminal, about the ICE address used by the WebRTC session from the terminal.

Step 509 is the same as step 310, which is not described in detail in this embodiment of the present invention.

It should be noted that in a procedure corresponding to FIG. 5, the terminal may possibly receive the refresh message for the page for multiple times. If the refresh message for the page is received for the second time, the terminal stops performing an ongoing refresh step. If it is assumed that a refresh message for a page is received for the second time when the browser module is performing step 504 or any step of steps 507 and 508, the browser module stops performing an ongoing step, such as step 504 or any step of steps 507 and 508, and re-performs step 504 and steps 507 to 508; however, step 506 is not performed repeatedly. That is, a timer for retaining a first ICE address to be in an activated state is not set again. In step 308, after acquiring the information about the ICE address pair used by the WebRTC session, the terminal detects whether the first ICE address in the ICE address pair exists in the browser or exists in the browser but is not in the activated state, the terminal cannot restore the transmission of the session content by using the ICE address corresponding to the information about the ICE address pair that is acquired and stored, but needs to perform ICE address pair negotiation again as in the prior art, so as to restore the transmission of the session content.

As an alternative manner, step 509 may be performed before step 508. That is, when the terminal determines, according to duration set by the timer, that duration for retaining the first ICE address used by the WebRTC session to be in the activated state reaches the duration set by the timer, the terminal stops the started timer, and does not retain the first ICE address used by the WebRTC session to be in the activated state (that is, stops sending a message packet to the ICE address and receiving a response returned from the first ICE address). In step 508, after acquiring the ICE address used by the WebRTC session, the terminal detects whether the ICE address exists in the browser or exists in the browser but is not in the activated state, and the terminal cannot restore the transmission of the session content by using the acquired and stored ICE address, but needs to perform ICE address pair negotiation again as in the prior art, so as to restore the transmission of the session content.

As can be seen from the above embodiment, when a page is refreshed, causing that a terminal cannot continue session interaction with a peer-end user, for example, a sound, a message, or the like of the peer cannot be received, an ICE address used by a session in the page is continued to be retained to be in an activated state, so that the terminal, after receiving a refreshed page, establishes a connection directly by using the ICE address in the activated state, and after receiving a refresh message for a page, the terminal does not need to negotiate an ICE address to determine a suitable ICE address for receiving and sending session content, which reduces waiting time for performing session content interaction with the peer-end user, thereby improving user experience.

Figure 6:
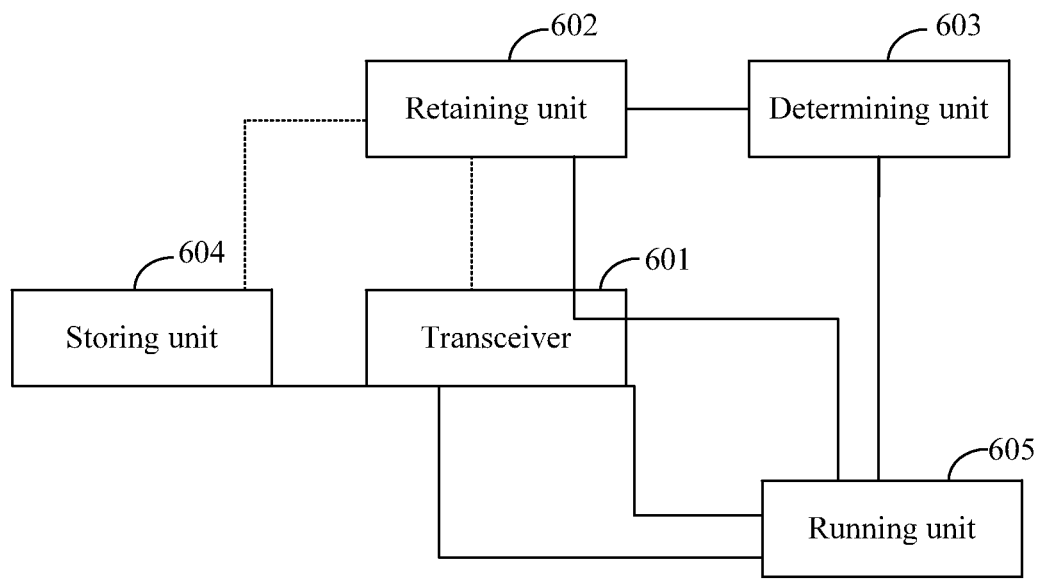
FIG. 6 is a schematic structural diagram of a terminal according to an embodiment of the present invention.

FIG. 6 is a schematic structural diagram of a terminal according to an embodiment of the present invention, which includes a transceiver 601, a retaining unit 602, a determining unit 603, a storing unit 604, and a running unit 605.

The transceiver 601 is configured to receive a refresh message for a page. The retaining unit 602 is configured to, after the transceiver receives the refresh message for the page, retain a first ICE address in an ICE address pair used by a session in the page to be in an activated state. The transceiver 601 is further configured to, after receiving the refresh message for the page, send a refresh request to a server and receive a refreshed page returned by the server, where the refreshed page includes an application program. The running unit 605 is configured to run the application program that is received by the transceiver and returned by the server, so as to restore transmission of session content of the session by using the first ICE address that is retained in the activated state by the retaining unit.

Optionally, the transceiver 601 is further configured to, before receiving the refresh message for the page, send information about an ICE address pair used by the session and a session identifier to the server, where the information about the ICE address pair used by the session includes information about the first ICE address and information about a second address.

Optionally, the application program includes the information about the ICE address and the session identifier, and the information about the ICE address pair used by the session includes the information about the first ICE address and the information about the second address; and the restoring, by the running unit 605, the transmission of the session content by using the first ICE address that is retained in the activated state by the retaining unit includes assigning an ICE address in the activated state and corresponding to the information about the first ICE address to the session, and sending data to the second address.

Optionally, the terminal further includes the storing unit 604 configured to store the information about the ICE address pair used by the session and the session identifier, where the information about the ICE address pair used by the session includes the information about the first ICE address and the information about the second address; and the restoring, by the running unit 605, the transmission of the session content by using the first ICE address that is retained in the activated state by the retaining unit includes assigning an ICE address in the activated state and corresponding to the information about the first ICE address to the session, and sending data to the second address.

Optionally, the retaining, by the retaining unit 602, the first ICE address in the ICE address pair used by the session in the page to be in the activated state includes starting a timer and retaining the first ICE address to be in the activated state within a time range set by the timer.

Optionally, the terminal further includes the determining unit 603 configured to, before the running unit restores the transmission of the session content by using the first ICE address that is retained in the activated state by the retaining unit, determine that the first ICE address is in the activated state.

Optionally, the retaining unit 602 is further configured to, after the running unit restores the transmission of the session content by using the first ICE address in the activated state, stop the started timer; or the retaining unit 602 is further configured to determine that duration for retaining the first ICE address to be in the activated state reaches duration set by the timer, and stop the started timer.

In the foregoing apparatus embodiment, the storing unit may be a memory (memory or storage), a random access memory (RAM), or a read-only memory (ROM), where this embodiment of the present invention sets no limit thereto.

Figure 7:
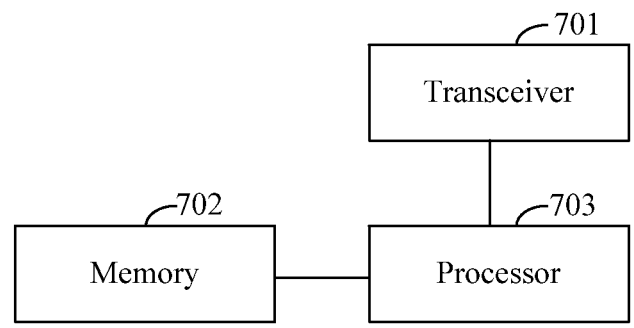
FIG. 7 is another schematic structural diagram of a terminal according to an embodiment of the present invention.

FIG. 7 is a schematic structural diagram of a terminal according to an embodiment of the present invention, which includes a transceiver 701, a memory 702, and a processor 703.

Specifically, the transceiver 701 is configured to perform communication with a terminal, receive an instruction sent to a terminal, and send signaling. In addition, the transceiver 701 illustrated in FIG. 7 may be the same as the transceiver 601 illustrated in FIG. 6 and perform related functions of the transceiver illustrated in FIG. 6. The memory 702 is coupled with the processor 703, where the memory 702 is configured to store various programs and applications and is invoked by the processor 703 to perform functions of the various programs and applications. The memory 702 illustrated in FIG. 7 may be the same as the storing unit 604 illustrated in FIG. 6 and perform related functions performed by the storing unit 604 illustrated in FIG. 6. Specifically, the transceiver according to this embodiment of the present invention is configured to receive a refresh message for a page; after receiving the refresh message for the page, send a refresh request to a server; and receive a refreshed page returned by the server, where the refreshed page includes an application program. The processor 703 is configured to, after the transceiver receives the refresh message for the page, retain an ICE address used by a session in the page to be in an activated state; and run the application program that is received by the transceiver and sent by the server, so as to restore transmission of session content by using the ICE address that is retained in the activated state by the retaining unit.

In addition, the processor 703 may further be configured to perform steps performed by the terminal or functional modules of the terminal that are described in the method embodiments illustrated in FIG. 1 to FIG. 5, which is not described in detail in this embodiment of the present invention.

It should be noted that in FIG. 6 and FIG. 7, the terminal may possibly receive the refresh message for the page for multiple times. For specific processing after the terminal receives the refresh message for the page for multiple times, reference may be made to related descriptions of the foregoing FIG. 2 to FIG. 5. This embodiment of the present invention sets no limit thereto. In addition, the terminals illustrated in FIG. 6 and FIG. 7 may perform any step performed by the terminals in the foregoing method procedure embodiments, which is not described in detail one by one in this embodiment of the present invention.

Figure 8:
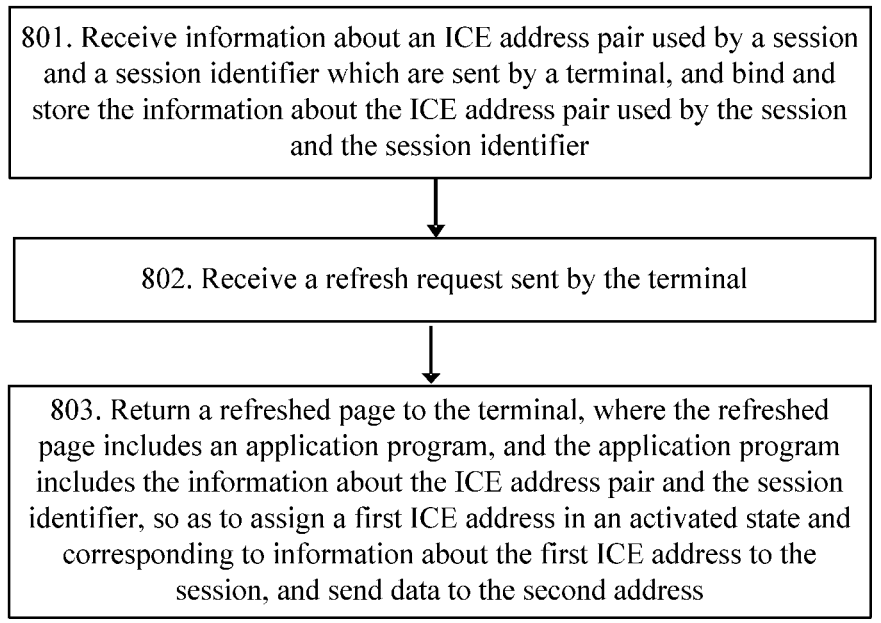
FIG. 8 is a flowchart of a method for restoring transmission of session content according to an embodiment of the present invention.

FIG. 8 is a method for restoring transmission of session content according to an embodiment of the present invention, which includes the following steps:

Step 801: Receive information about an ICE address pair used by a session and a session identifier that are sent by a terminal, and bind and store the information about the ICE address pair used by the session and the session identifier, where the information about the ICE address pair used by the session includes information about the first ICE address and information about a second address.

Specifically, a server receives the information about the ICE address pair used by the session and the session identifier that are sent by the terminal, and binds and stores the information about the ICE address pair used by the session and the session identifier. For a specific implementation process thereof, reference may be made to related descriptions of step 203 and step 204 in FIG. 2 and steps 302 and 303 in FIG. 3, which is not described in detail in this embodiment of the present invention.

Step 802: Receive a refresh request sent by the terminal.

Specifically, the refresh request is sent by the terminal to the server after the terminal receives a refresh message for a page. Reference may be made to related descriptions of step 206 in FIG. 2 and step 305 in FIG. 3, which is not described in detail in this embodiment of the present invention.

Step 803: Return a refreshed page to the terminal, where the refreshed page includes an application program, and the application program includes the information about the ICE address pair and the session identifier, so that the terminal assigns, by running the application program, a first ICE address in the activated state and corresponding to the information about the first ICE address to the session, and sends data to the second address.

Specifically, reference may be made to related descriptions of step 209 in FIG. 2 and step 308 in FIG. 3, which is not described in detail in this embodiment of the present invention.

Figure 9:
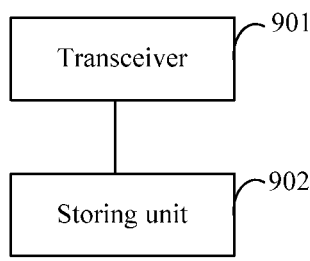
FIG. 9 is a schematic structural diagram of a server according to an embodiment of the present invention.

FIG. 9 is a schematic structural diagram of a server according to an embodiment of the present invention, which includes a transceiver 901 and a storing unit 902.

Specifically, the transceiver 901 is configured to receive information about an ICE address pair used by a session and a session identifier that are sent by a terminal, where the information about the ICE address pair used by the session includes information about the first ICE address and information about a second address; and the storing unit 902 is configured to bind and store the information about the ICE address pair used by the session and the session identifier that are received by the transceiver 901. The transceiver 901 is further configured to receive a refresh request sent by the terminal; and return a refreshed page to the terminal, where the refreshed page includes an application program, and the application program includes the information about the ICE address pair and the session identifier, so that the terminal assigns, by running the application program, a first ICE address in the activated state and corresponding to the information about the first ICE address to the session, and sends data to the second address.

Figure 10:
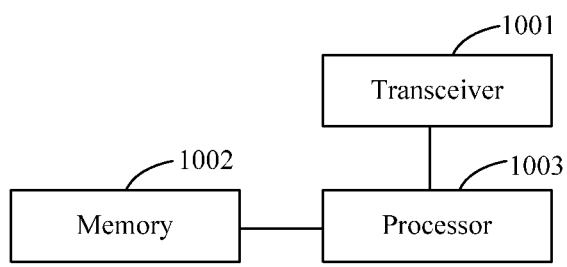
FIG. 10 is another schematic structural diagram of a server according to an embodiment of the present invention.

FIG. 10 is a schematic structural diagram of a server according to an embodiment of the present invention, which includes a transceiver 1001, a memory 1002, and a processor 1003.

Specifically, the transceiver 1001 is configured to perform communication with a terminal, receive a refresh request sent by a terminal, and return a refreshed page to the terminal. In addition, the transceiver 1001 illustrated in FIG. 10 may be the same as the transceiver 901 illustrated in FIG. 9 and perform related functions of the transceiver illustrated in FIG. 6. The memory 1002 is coupled with the processor 1003, where the memory 1002 is configured to store various programs and applications and is invoked by the processor 1003 to perform functions of the various programs and applications. The memory 1002 illustrated in FIG. 10 may be the same as the storing unit 902 illustrated in FIG. 9 and perform related functions performed by the storing unit 902 illustrated in FIG. 9. Specifically, the transceiver 1001 in this embodiment of the present invention is configured to receive information about an ICE address pair used by a session and a session identifier which are sent by a terminal; receive a refresh request sent by the terminal; and return a refreshed page to the terminal, where the refreshed page includes an application program, and the application program includes the information about the ICE address pair and the session identifier, so that the terminal runs the application program to restore, by using a first ICE address in an activated state and corresponding to the information about the ICE address pair, transmission of session content of a session corresponding to the session identifier. The memory is configured to bind and store the information about the ICE address pair used by the session and the session identifier.

In addition, the processor 1003 may further be configured to perform steps performed by the servers described in the method embodiments illustrated in FIG. 1 to FIG. 5, which is not described in detail in this embodiment of the present invention.

In the foregoing embodiments, the terminal may be various mobile terminals, for example, various smart phones, tablet computers, and mobile reading devices. In the foregoing embodiments, and especially the embodiment corresponding to FIG. 7, the terminal is divided into apparatuses by function logic, but the above division is not limited by the present invention, so long as corresponding functions can be implemented. In addition, the specific names of the apparatuses are only used for differentiation and not intended to limit the protection scope of the present invention. All the functions of functional modules or apparatuses of the terminals illustrated in FIG. 1 to FIG. 5 can be run and completed by a processor of the terminal.

The foregoing descriptions are merely preferred specific embodiments of the present invention, but are not intended to limit the protection scope of the present invention. Any variation or replacement figured out by persons skilled in the art within the technical scope disclosed in the present invention shall fall within the protection scope of the present invention. Therefore, the protection scope of the present invention shall be subject to the protection scope of the claims.

What is claimed is:

1. A method for restoring transmission of session content, the method comprising:
   transmitting, by a terminal to another terminal, a session content via a session in a page browsed by the terminal;
   storing, by the terminal, a first Interactive Connectivity Establishment (ICE) address in an ICE address pair used by the session;
   detecting, by the terminal, that a refresh function for the page has been triggered or that the browser has been restarted;
   retaining the first ICE address by the terminal based on the detecting that the refresh function for the page has been triggered or that the browser has been restarted, with the retaining being performed in an activated state to avoid releasing a resource of the first ICE address corresponding to the session;
   sending, by the terminal during the retaining of the first ICE address in the activated state, a refresh request requesting a refreshing of the page in response to the detecting;
   receiving, by the terminal, a refreshed page returned in response to the refresh request, wherein the refreshed page comprises an application program; and
   running, by the terminal, the application program of the refreshed page to restore, using the first ICE address, transmission of the session content of the session.

2. The method according to claim 1, wherein before the detecting that a refresh function for the page has been triggered or that the browser has been restarted, the method further comprises sending information about the ICE address pair and a session identifier to a server, and wherein the information about the ICE address pair comprises information about the first ICE address and information about a second address.

3. The method according to claim 1, wherein retaining the first ICE address in the ICE address pair comprises starting a timer and retaining the first ICE address within a time range set by the timer.

4. The method according to claim 3, wherein before restoring transmission of the session content using the first ICE address, the method further comprises determining that the first ICE address is in the activated state.

5. The method according to claim 4, wherein after restoring transmission of the session content using the first ICE address, the method further comprises stopping the timer.

6. The method according to claim 4, wherein after restoring transmission of the session content using the first ICE address, the method further comprises:
   determining that a duration for retaining the first ICE address in the activated state reaches a duration set by the timer; and
   stopping the started timer and setting the first ICE address in an inactivated state.

7. A terminal device, comprising:
   a memory storage comprising instructions; and
   one or more processors in communication with the memory, wherein the one or more processors execute the instructions to:
      transmit to another terminal, a session content via a session in a page browsed by the terminal;
      store a first Interactive Connectivity Establishment (ICE) address in an ICE address pair used by the session;
      detect that a refresh function for the page has been triggered or that the browser has been restarted;
      retain the first ICE address in an activated state based on the detecting that the refresh function for the page has been triggered or that the browser has been restarted, with the retaining being performed in an activated state to avoid releasing a resource of the first ICE address corresponding to the session;
      send during the retaining of the first ICE address in the activated state, a refresh request requesting a refreshing of the page in response to the detecting;
      receive a refreshed page returned in response to the refresh request, wherein the refreshed page comprises an application program; and
      run the application program of the refreshed page to restore, using the first ICE address, transmission of the session content of the session.

8. The terminal according to claim 7, wherein before the one or more processors execute the instructions to detect that a refresh function for the page has been triggered or that the browser has been restarted, the one or more processors execute the instructions to send information to a server about the ICE address pair and a session identifier, wherein the information about the ICE address pair comprises information about the first ICE address and information about a second address.

9. The terminal according to claim 7, wherein retaining the first ICE address in the ICE address pair comprises starting a timer and retaining the first ICE address within a time range set by the timer.

10. The terminal according to claim 9, wherein before the one or more processors execute the instructions to restore transmission of the session content using the first ICE address, the one or more processors execute the instructions to determine that the first ICE address is in the activated state.

11. The terminal according to claim 10, wherein after the one or more processors execute the instructions to restore transmission of the session content using the first ICE address, the one or more processors execute the instruction to stop the timer.

12. The terminal according to claim 10, wherein after the one or more processors execute the instructions to restore transmission of the session content using the first ICE address, the one or more processors execute the instructions to:
   determine that a duration for retaining the first ICE address in the activated state reaches a duration set by the timer; and
   stop the started timer and set the first ICE address to an inactivated state.

13. The method according to claim 1, wherein the retaining the first ICE address by the terminal, in an activated state to avoid releasing a resource of the first ICE address corresponding to the session, based on the detecting comprises:

sending, by the terminal, a message to a session traversal utilities for network address translator (STUN) or traversal using relay NAT (TURN) server which assigned the first ICE address to the session after the detecting, wherein the message is used to continue to retain the first ICE address in the active state; and receiving, by the terminal, a response from the STUN or TURN server.

14. The terminal according to claim 7, wherein the retaining the first ICE address in the ICE address pair comprises:

sending, a message to a session traversal utilities for network address translator (STUN) or traversal using relay NAT (TURN) server which assigned the first ICE address to the session after the detecting, wherein the message is used to continue to retain the first ICE address in the active state; and receiving a continue to retain response from the STUN or TURN server.

* * * * *